US009153804B2

(12) United States Patent
Kim et al.

(10) Patent No.: US 9,153,804 B2
(45) Date of Patent: Oct. 6, 2015

(54) SECONDARY BATTERY

(75) Inventors: Sungbae Kim, Yongin-si (KR); Yongsam Kim, Yongin-si (KR); Sangwon Byun, Yongin-si (KR)

(73) Assignees: SAMSUNG SDI CO., LTD., Yongin-si,Gyeonggi-do (KR); ROBERT BOSCH GmbH, Stuttgart (DE)

( * ) Notice: Subject to any disclaimer, the term of this patent is extended or adjusted under 35 U.S.C. 154(b) by 736 days.

(21) Appl. No.: 13/064,477

(22) Filed: Mar. 28, 2011

(65) Prior Publication Data

US 2011/0287311 A1 Nov. 24, 2011

(30) Foreign Application Priority Data

May 20, 2010 (KR) ........................ 10-2010-0047503

(51) Int. Cl.
*H01M 2/08* (2006.01)
*H01M 2/06* (2006.01)
*H01M 2/30* (2006.01)

(52) U.S. Cl.
CPC *H01M 2/08* (2013.01); *H01M 2/06* (2013.01); *H01M 2/30* (2013.01); *H01M 2/305* (2013.01); *Y10T 29/49108* (2015.01)

(58) Field of Classification Search
CPC ........... H01M 2/06; H01M 2/08; H01M 2/30; H01M 2/217
USPC ......................................... 429/178, 180, 181
See application file for complete search history.

(56) References Cited

U.S. PATENT DOCUMENTS

| | | | | |
|---|---|---|---|---|
| 7,976,969 | B2 * | 7/2011 | Kim et al. | 429/7 |
| 2011/0104562 | A1 * | 5/2011 | Byun et al. | 429/181 |

FOREIGN PATENT DOCUMENTS

| | | | |
|---|---|---|---|
| KR | 10 2001-0017098 | A | 3/2001 |
| KR | 10-2003-0066243 | A | 8/2003 |
| KR | 10-2003-0081940 | A | 10/2003 |
| KR | 10 2007-0014633 | A | 2/2007 |
| KR | 1020050069446 | * | 2/2007 |

OTHER PUBLICATIONS

Korean Office Action in KR 10-2010-0047503, dated Jul. 19, 2011 (Kim, et al.).
Korean Notice of Allowance dated Sep. 6, 2012 for KR 10-2010-0047503 (Kim, et al.).

* cited by examiner

*Primary Examiner* — Ula C Ruddock
*Assistant Examiner* — Thomas Parsons
(74) *Attorney, Agent, or Firm* — Lee & Morse, P.C.

(57) ABSTRACT

A secondary battery includes a case with an internal space, at least one electrode assembly in the case, the electrode assembly including a separator between a positive electrode plate and a negative electrode plate, a current collector plate coupled to the electrode assembly, the current collector plate including an electrode terminal, a dielectric body with a through-hole on the current collector plate, the electrode terminal of the current collector plate protruding through the through-hole of the dielectric body, a gasket in the through-hole of the dielectric body, and a cap plate coupled to an upper portion of the dielectric body.

20 Claims, 3 Drawing Sheets

100 133 180 130 140 141 150 151 170 161 142 160 132 132a 132b 144 143 145 131 124 120

SECONDARY BATTERY

BACKGROUND

1. Field

Embodiments relate to a secondary battery.

2. Description of the Related Art

Generally, unlike primary batteries, i.e., not chargeable batteries, secondary batteries are chargeable and dischargeable. Low-capacity secondary batteries are widely used in a variety of high-tech electronic devices, e.g., cellular phones, notebook computers, camcorders, and the like. High-capacity secondary batteries are widely used as power supplies, e.g., for electric vehicles or hybrid vehicles. The secondary battery, i.e., rechargeable battery, generally includes an electrode assembly accommodated in a case, a cap plate at an upper portion of the case, and an electrode terminal coupled to the electrode assembly and protruding through the cap plate.

SUMMARY

Embodiments are directed to a secondary battery, which substantially overcomes one or more of the problems due to the limitations and disadvantages of the related art.

It is therefore a feature of an embodiment to provide a secondary battery with a structure capable of preventing a short-circuit between an electrode terminal and a cap plate, thereby improving product reliability.

At least one of the above and other features and advantages may be realized by providing a secondary battery, including a case with an internal space, at least one electrode assembly in the case, the electrode assembly including a separator between a positive electrode plate and a negative electrode plate, a current collector plate coupled to the electrode assembly, the current collector plate including an electrode terminal, a dielectric body with a through-hole on the current collector plate, the electrode terminal of the current collector plate protruding through the through-hole of the dielectric body, a gasket in the through-hole of the dielectric body, and a cap plate coupled to an upper portion of the dielectric body.

The gasket may completely cover inner surfaces of the through-hole of the dielectric body.

In addition, at least a portion of the gasket may be between the dielectric body and the current collector plate.

The dielectric body may include a protrusion protruding into the through-hole to define a space between the protrusion and each of the cap plate and the current collector plate, the gasket being engaged with the protrusion.

The gasket may fill the space between the protrusion and each of the cap plate and the current collector plate.

The gasket may be formed in the dielectric body by inject molding.

In addition, the gasket may fill a gap between the dielectric body and the electrode terminal.

Further, the gasket may be on inner sidewalls of the through-hole, at upper and lower portions of the through-hole along the edge of the through-hole.

The cap plate may include a terminal hole aligned with the through-hole of the dielectric body, the gasket protruding through the through-hole into the terminal hole of the cap plate.

The gasket may be inside the cap plate and along a circumference of the through-hole of the dielectric body.

The dielectric body may include a protrusion and a groove on an upper surface thereof, the protrusion and the groove fitting into corresponding portions of a lower surface of the cap plate.

The dielectric body may include stepped portions on a lower surface thereof, the stepped portions of the dielectric body fitting into corresponding stepped portions on an upper surface of the current collector plate.

The dielectric body may be between the cap plate and the current collector plate.

At least one of the above and other features and advantages may be realized by providing a method of forming a secondary battery, including forming at least one electrode assembly in a case, the electrode assembly including a separator between a positive electrode plate and a negative electrode plate, forming a current collector plate coupled to the electrode assembly, the current collector plate including an electrode terminal, forming a dielectric body with a through-hole on the current collector plate, the electrode terminal of the current collector plate protruding through the through-hole of the dielectric body, forming a gasket in the through-hole of the dielectric body, and forming a cap plate coupled to an upper portion of the dielectric body. Forming the gasket may include injection molding of material into the through-hole of the dielectric body.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
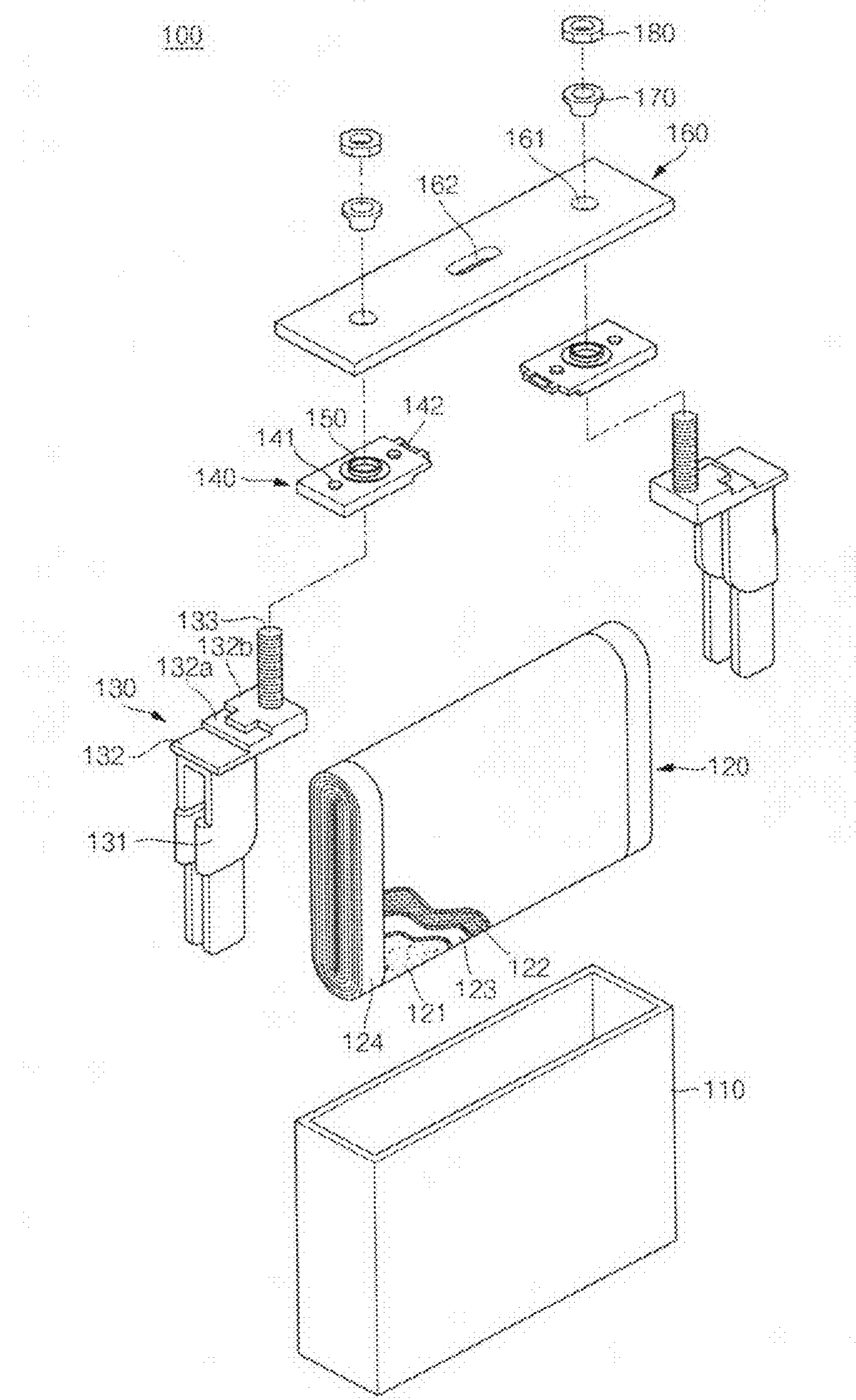
FIG. 1 illustrates an exploded perspective view of a secondary battery according to an embodiment.

Korean Patent Application No. 10-2010-0047503, filed on May 20, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

A secondary battery according to an embodiment will now be described with reference to FIG. 1. FIG. 1 illustrates an exploded perspective view of a secondary battery according to an embodiment.

Referring to FIG. 1, the secondary battery 100 may include a case 110, an electrode assembly 120 accommodated within the case 110, a current collector plate 130 electrically connected to the electrode assembly 120, a first dielectric body 140 through which the current collector plate 130 passes, a gasket 150 coupled to the inside of the first dielectric body 140, a cap plate 160 coupled to an upper portion of the first dielectric body 140, and a second dielectric body 170 passing through the cap plate 160 and surrounding a portion of the current collector plate 130 passing through the first dielectric body 140. A nut 180 may further be coupled to the current collector plate 130.

The case 110 may have any suitable shape, e.g., a hexahedral shape, and may have an internal space. The case 110 may be made of a conductive metal, e.g., aluminum, an aluminum alloy, a nickel plated stick, etc.

The electrode assembly 120 may be accommodated in the internal space of the case 110. The electrode assembly 120 may include a positive electrode plate 121, a negative electrode plate 122, and a separator 123 interposed therebetween. The electrode assembly 120 may be formed by winding a stack of the positive electrode plate 121, the negative electrode plate 122, and the separator 123 in a jelly-roll configuration. In the illustrated embodiment, for brevity, only one electrode assembly 120 is provided in the case 110. However, a plurality of electrode assemblies 120 may be provided in the case 110 in alternative embodiments.

In addition, the electrode assembly 120 may include uncoated portions 124 provided at both ends of the case 110. The uncoated portions 124 are provided in pair. That is, the uncoated portions 124 are provided at one end of the electrode assembly 120 to be connected to the positive electrode plate 121 and at the other end of the electrode assembly 120 to be connected to the negative electrode plate 122.

The current collector plate 130 may be connected to each of the uncoated portions 124. That is, one current collector plate 130 may be coupled to one of the uncoated portions 124 connected to the positive electrode plate 121, and one current collector plate 130 may be coupled to one of the uncoated portions 124 connected to the negative electrode plate 122. In the following description, the current collector plate 130 is described with regard to the uncoated portion 124 connected to the positive electrode plate 122 by way of example.

The current collector plate 130 may include a first region 131, a second region 132, and an electrode terminal 133. The first region 131 is formed in a first direction, i.e., to extend along the uncoated portion 124, and is connected to the uncoated portion 124. The second region 132 extends from the first region 131 in a second direction, i.e., a direction substantially perpendicular to the first direction, to overlap a portion of a top of the electrode assembly 120. The electrode terminal 133 may extend from the second region 132 in the first direction, i.e., away from the electrode assembly 120.

The first region 131 may be coupled to the uncoated portion 124 along the first direction, i.e., a direction along which the electrode assembly 120 is inserted into the case 110. The first region 131 may be coupled to both ends of the uncoated portion 124 in a widthwise direction of the uncoated portion 124 in a state in which the uncoated portion 124 is compressed. That is, the first region 131 may contact and overlap two opposing surfaces of the uncoated portion 124. The coupling of the first region 131 and the uncoated portion 124 may be performed by, e.g., welding.

The second region 132 may include a first stepped portion 132*a* and a second stepped portion 132*b* provided in the second direction. The first and second stepped portions 132*a* and 132*b* may be combined, e.g., conformally, with a lower portion of the first dielectric body 140, as will be described in more detail below, thereby increasing a coupling force therebetween.

The electrode terminal 133 may be formed at an upper portion of the second region 132. The electrode terminal 133 protrudes from the upper portion of the second region 132 in the first direction away from the second region 132. The electrode terminal 133 may be disposed in the interior of the first dielectric body 140 and the gasket 150, i.e., may extend through the first dielectric body 140 and the gasket 150, so that the electrode terminal 133 may be electrically independent of the cap plate 160. In addition, a male thread may be formed on an outer periphery of the electrode terminal 133, so the electrode terminal 133 may be engaged with the nut 180.

Figure 2:
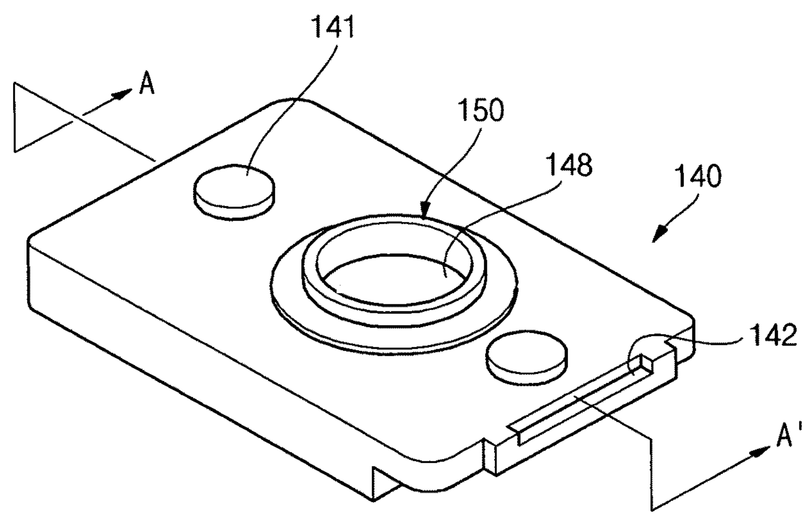
FIG. 2 illustrates a perspective view of a first dielectric body and a gasket coupled to each other in the secondary battery of FIG. 1.

Hereinafter, the first dielectric body 140 and the gasket 150 will be described with reference to FIGS. 2-5. FIG. 2 illustrates a perspective view of the first dielectric body 140 coupled to the gasket 150, FIG. 3 illustrates a bottom view of the first dielectric body 140 coupled to the gasket 150, FIG. 4 illustrates a cross-sectional view taken along line A-A' of FIG. 2, and FIG. 5 illustrates an enlarged, partial cross-sectional view of the first dielectric body 140 coupled between the cap plate 60 and the current collector plate 130.

As illustrated in FIGS. 1-2, the first dielectric body 140 may be substantially plate-shaped, and may be formed of any suitable dielectric material. As illustrated in FIG. 5, the first dielectric body 140 may be downwardly coupled to an upper portion of the current collector plate 130 in the second direction, and may be upwardly coupled to a lower portion of the cap plate 160 in the second direction. In other words, the first dielectric body 140 may be securely coupled between a bottom surface of the cap plate 160 and an upper surface of the second region 132 of the current collector plate 130.

Figure 3:
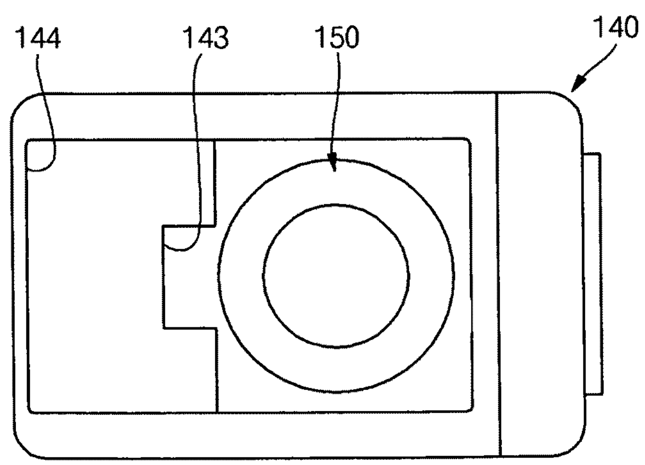
FIG. 3 illustrates a bottom view of a first dielectric body and a gasket coupled to each other in the secondary battery of FIG. 1.
Figure 4:
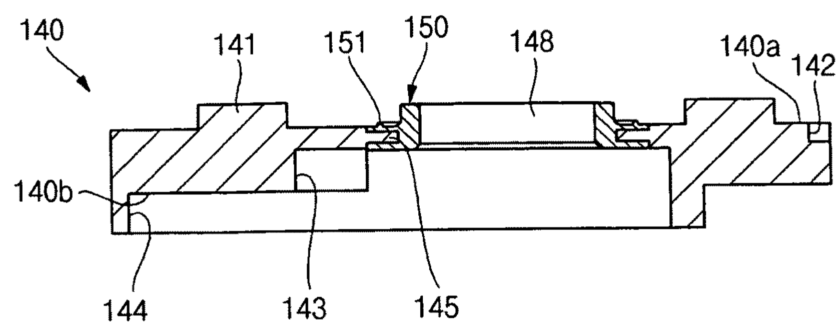
FIG. 4 illustrates a cross-sectional view taken along line A-A' of FIG. 2.

As illustrated in FIGS. 2-4, the first dielectric body 140 may include a protrusion 141 and a groove 142 in a top surface 140*a* thereof. In addition, the first dielectric body 140 may include a first stepped portion 143 and a second stepped portion 144 formed on its bottom surface 140*b*. Therefore, the protrusion 141 and groove 142 in the top surface of the first dielectric body 140 may fit into corresponding portions of the bottom surface of the cap plate 160 to provide secure connection therebetween. In other words, the protrusion 141 and groove 142 in the top surface 140*a* of the first dielectric body 140 may fit into corresponding groove and protrusion in the bottom surface of the cap plate 160. Further, as illustrated in FIGS. 4-5, the first and second stepped portions 143 and 144 in the bottom surface 140*b* of the first dielectric body 140 may fit into respective second and first stepped portions 132*b* and 132*a* of the second region 132 of the current collector plate 130 to provide secure connection therebetween.

Figure 5:
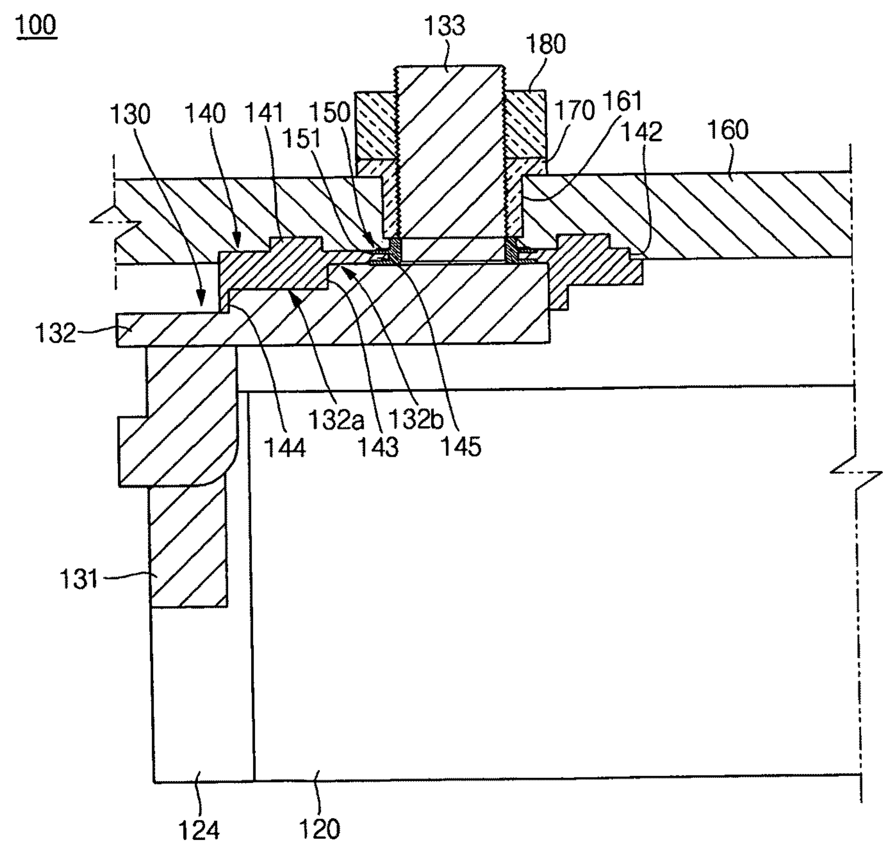
FIG. 5 illustrates a partial cross-sectional view of the secondary battery in FIG. 1.

As further illustrated in FIGS. 4-5, the first dielectric body 140 may include a through-hole 148. The through-hole 148 may be defined by a stepped portion 145 at the center of the first dielectric body 140. The stepped portion 145 may define an edge of the through-hole 148, e.g., the stepped portion 145 may define the through-hole 148 to have a substantially circular shape. The through-hole 148 may extend through an entire thickness of the first dielectric body 140, and may correspond to, e.g., be aligned with, a terminal hole 161 through the cap plate 160, i.e., when the first dielectric body 140 is secured to the cap plate 160. As such, the electrode terminal 133 may extend through the through-hole 148.

The through-hole 148 has a larger diameter, e.g., a slightly larger diameter, than that of the electrode terminal 133. As illustrated in FIG. 2-5, the gasket 150 may be positioned along sidewalls of the through-hole 148, i.e., between inner sidewalls of the through-hole 148 and the electrode terminal 133 to fill a gap therebetween.

In detail, the gasket 150 may be coupled to the stepped portion 145, e.g., the gasket 150 may be conformally formed on the stepped portion 145 inside the through-hole 148, to cover all exposed inner surfaces inside the through-hole 148 of the first dielectric body 140. As such, the gasket 150 may hermetically seal a gap between the first dielectric body 140 and the cap plate 160, thereby preventing an electrolyte from permeating through the terminal hole. In other words, the gasket 150 may hermetically seal a bottom surface of the through-hole 148, e.g., at least a portion of the gasket 150 may be between the dielectric body 140 and the current collector plate 130. Therefore, the gasket 150 may prevent the electrode terminal 133 and the cap plate 160 from being electrically connected to each other via electrolyte permeation.

As further illustrate in FIGS. 4-5, the gasket 150 may include a stepped portion 151 protruding toward the first dielectric body 140, i.e., overlapping and coupled to the stepped portion 145 of the first dielectric body 140. In other words, the stepped portion 151 of the gasket 150 may be meshed with the stepped portion 145 of the first dielectric body 140. Therefore, the gasket 150 may be securely coupled to the first dielectric body 140, thereby preventing the electrolyte from permeating.

In addition, in order to fasten the gasket 150 and the first dielectric body 140 with each other in a more secure manner, the gasket 150 may be formed by insert molding in a state in which the first dielectric body 140 is provided. For example, instead of forming the gasket 150 and the first dielectric body 140 separately, injection molding may be performed on the first dielectric body 140 to form the gasket 150, thereby fastening the gasket 150 with the first dielectric body 140 more tightly. In another example, the gasket 150 may be prepared, and subsequently, injection molding may be performed on the first dielectric body 140, thereby fastening the first dielectric body 140 and the gasket 150 with each other.

Referring back to FIGS. 1 and 5, the cap plate 160 may be formed on the case 110 and may seal the case 110. The cap plate 160 may be coupled to the case 110, thereby preventing leakage of the electrolyte contained in the case 110. The cap plate 160 may include a terminal hole 161 formed at the inside thereof, so that the electrode terminal 133 may pass through the terminal hole 161 to protrude upwardly and away from the case 110.

As illustrated in FIGS. 1-2, the gasket 150 may protrude upwardly, i.e., relatively to an upper surface of the first dielectric body 140. Further, as illustrated in FIG. 5, the gasket 150 may be positioned inside the terminal hole 161, so the second dielectric body 170 may be inserted into the terminal hole 161 from an opposite direction. In other words, the gasket 150 may insulate a lower portion of the electrode terminal 133 from the cap plate 160, and the second dielectric body 170 may insulate an upper portion of the electrode terminal 133 from the cap plate 160. Therefore, it may be possible to prevent the electrode terminal 133 positioned inside the terminal hole 161 from contacting the cap plate 160, thereby preventing the electrode terminal 133 from being coupled to the cap plate 160.

In addition, as illustrated in FIG. 1, the cap plate 160 may include a vent 162 formed at the center thereof. In a case where an internal gas is generated in the case 110 due to overcharging, the vent 162 may open to release the gas.

The second dielectric body 170 may be formed between the cap plate 160 and the electrode terminal 133. The second dielectric body 170 may make the cap plate 150 electrically independent of the electrode terminal 133. In addition, since the second dielectric body 170 is formed on the cap plate 160, the nut 180 may be electrically independent of the cap plate 160, when the cap plate 160 is engaged with the nut 180.

The nut 180 may be formed on the second dielectric body 170. The nut 180 may include a female thread formed at the inside thereof to be engaged with the electrode terminal 133. The nut 180 may affix the electrode terminal 133, thereby fixing positions of the current collector plate 130 and the electrode assembly 120.

As described above, the secondary battery 100 according to an embodiment may include the gasket 150 inside the through-hole 148 of the first dielectric body 140, so the electrode terminal 133 passing through the through-hole 148 may be insulated from the cap plate 160. As such, electrolyte permeation into a gap, i.e., a space, between the electrode terminal 133 and the cap plate 160 may be prevented, thereby preventing the electrode terminal 133 and the cap plate 160 from being electrically connected to each other. Therefore, product reliability of the secondary battery 100 may be improved.

In contrast, in a conventional secondary battery, i.e., a battery without the gasket in the first dielectric body, an electrolyte may permeate between the electrode terminal and the cap plate, thereby causing a short-circuit therebetween and reducing product reliability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:

a case with an internal space;

at least one electrode assembly in the case, the electrode assembly including a separator between a positive electrode plate and a negative electrode plate;

a current collector plate coupled to the electrode assembly, the current collector plate including an electrode terminal;

a dielectric body with a through-hole on the current collector plate, the dielectric body having a first stepped portion, and the electrode terminal of the current collector plate protruding through the through-hole of the dielectric body;

a gasket in the through-hole of the dielectric body, the gasket overlapping at least two different surfaces of the dielectric body, the gasket having a second stepped portion overlapping and coupled to the first stepped portion; and a cap plate coupled to an upper portion of the dielectric body.

2. The secondary battery as claimed in claim 1, wherein the gasket completely covers inner surfaces of the through-hole of the dielectric body.

3. The secondary battery as claimed in claim 1, wherein at least a portion of the gasket is between the dielectric body and the current collector plate.

4. The secondary battery as claimed in claim 3, wherein the dielectric body includes a protrusion protruding into the through-hole to define a space between the protrusion and each of the cap plate and the current collector plate, the gasket being engaged with the protrusion.

5. The secondary battery as claimed in claim 4, wherein the gasket fills the space between the protrusion and each of the cap plate and the current collector plate.

6. The secondary battery as claimed in claim 1, wherein the gasket fills a gap between the dielectric body and the electrode terminal.

7. The secondary battery as claimed in claim 1, wherein the gasket is on inner sidewalls of the through-hole.

8. The secondary battery as claimed in claim 1, wherein the cap plate includes a terminal hole aligned with the through-hole of the dielectric body, the gasket protruding through the through-hole into the terminal hole of the cap plate.

9. The secondary battery as claimed in claim 8, wherein the gasket is inside the cap plate and along a circumference of the through-hole of the dielectric body.

10. The secondary battery as claimed in claim 1, wherein the dielectric body includes a protrusion and a groove on an upper surface thereof, the protrusion and the groove fitting into corresponding portions of a lower surface of the cap plate.

11. The secondary battery as claimed in claim 10, wherein the dielectric body includes stepped portions on a lower surface thereof, the stepped portions of the dielectric body fitting into corresponding stepped portions on an upper surface of the current collector plate.

12. The secondary battery as claimed in claim 1, wherein the dielectric body is between the cap plate and the current collector plate.

13. The secondary battery as claimed in claim 1, wherein the gasket includes:

- a first portion extending between the electrode terminal and a first surface of the at least two different surfaces of the dielectric body; and
- a second portion extending from the first portion, the second portion being between the current collector plate and a second surface of the at least two different surfaces of the dielectric body, the first and second surfaces of the dielectric body being perpendicular to each other.

14. The secondary battery as claimed in claim 13, wherein the first portion of the gasket is directly between the electrode terminal and the first surface of the dielectric body, and the second portion is directly between the current collector plate and the second surface of the dielectric body.

15. The secondary battery as claimed in claim 13, wherein the second portion of the gasket is parallel to the second surface of the dielectric body and to the cap plate.

16. The secondary battery as claimed in claim 13, wherein the gasket further comprises a third portion parallel to the second portion, the gasket having a cross-section of an inverted "F", and a portion of the dielectric body filling an entire space between the second and third portions.

17. The secondary battery as claimed in claim 1, wherein the dielectric body includes a first end facing the electrode terminal, the gasket continuously extending along a lower part of the electrode terminal and overlapping three different surfaces of the first end of the dielectric body.

18. The secondary battery as claimed in claim 1, wherein the electrode terminal extends vertically from a horizontal portion of the current collector plate, the gasket being in direct contact with each of the electrode terminal, the horizontal portion of the current collector plate, the dielectric body, and the cap plate.

19. A method of forming a secondary battery, comprising:

- forming at least one electrode assembly in a case, the electrode assembly including a separator between a positive electrode plate and a negative electrode plate;
- forming a current collector plate coupled to the electrode assembly, the current collector plate including an electrode terminal;
- forming a dielectric body with a through-hole on the current collector plate, the dielectric body having a first stepped portion, and the electrode terminal of the current collector plate protruding through the through-hole of the dielectric body;
- forming a gasket in the through-hole of the dielectric body, such that the gasket overlaps at least two different surfaces of the dielectric body, the gasket having a second stepped portion overlapping and coupled to the first stepped portion; and
- forming a cap plate coupled to an upper portion of the dielectric body.

20. The method as claimed in claim 19, wherein forming the gasket includes insert molding of material into the through-hole of the dielectric body.

* * * * *